United States Patent
Nagatomo

(10) Patent No.: US 8,400,331 B2
(45) Date of Patent: Mar. 19, 2013

(54) VEHICLE-MOUNTED DEVICE, INFORMATION OUTPUT METHOD, AND INFORMATION PROVIDING SYSTEM

(75) Inventor: Hideyuki Nagatomo, Kawasaki (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 365 days.

(21) Appl. No.: 12/808,445

(22) PCT Filed: Dec. 18, 2008

(86) PCT No.: PCT/JP2008/073032
§ 371 (c)(1),
(2), (4) Date: Jun. 16, 2010

(87) PCT Pub. No.: WO2009/081828
PCT Pub. Date: Jul. 2, 2009

(65) Prior Publication Data
US 2010/0289672 A1 Nov. 18, 2010

(30) Foreign Application Priority Data
Dec. 21, 2007 (JP) .................................. 2007-331077

(51) Int. Cl.
*G08G 1/123* (2006.01)
(52) U.S. Cl. ................... 340/988; 340/905; 340/995.13; 340/995.27; 340/995.28
(58) Field of Classification Search .................. 340/988, 340/905, 995.1, 995.12, 995.13, 996, 901, 340/995.27, 995.28
See application file for complete search history.

(56) References Cited

U.S. PATENT DOCUMENTS
7,629,898 B2 * 12/2009 Kirkpatrick .................. 340/902
7,657,370 B2 * 2/2010 Nagase et al. ................ 701/465

FOREIGN PATENT DOCUMENTS
| EP | 1 422 679 | 5/2004 |
| JP | 05-142996 | 6/1993 |
| JP | 10-104005 | 4/1998 |
| JP | 2001-101581 | 4/2001 |

OTHER PUBLICATIONS

Notification of Transmittal of Translation of the International Preliminary Report on Patentability (Application No. PCT/JP2008/073032) dated Sep. 2, 2010.
Supplementary European Search Report (Application No. 08865056.9) dated Mar. 26, 2012.
International Search Report for Application Serial No. PCT/JP2008/073032.
Written Notification of Reason for Refusal (Application No. 2007-331077) dated Jul. 3, 2012.

* cited by examiner

*Primary Examiner* — Toan N Pham
(74) *Attorney, Agent, or Firm* — Eric J. Robinson; Robinson Intellectual Property Law Office, P.C.

(57) ABSTRACT

A vehicle-mounted device (10) which receives and outputs a radio wave containing at least direction information as information includes: detection means which detects the radio wave; and control means which compares the detection direction received from the direction detection means which detects the direction of the vehicle head to the direction information so as to judge whether the information is to be outputted. Thus, it is possible to provide a vehicle-mounted device which can provide only the information required by a user, a method for outputting the information, and an information providing system.

4 Claims, 5 Drawing Sheets

US 8,400,331 B2

VEHICLE-MOUNTED DEVICE, INFORMATION OUTPUT METHOD, AND INFORMATION PROVIDING SYSTEM

TECHNICAL FIELD

The present invention relates to a vehicle-mounted device, an information output method and an information providing system.

BACKGROUND ART

Now, research and development of the Intelligent Transport Systems (ITS), which are new transport systems that use various information technologies to solve road traffic problems such as traffic accidents or traffic jams, are advanced.

As one form of the ITS, a technique has been disclosed in which Dedicated Short Range Communication (DSRC) is utilized to provide traffic information and the like from an information providing system to a vehicle-mounted device. (For example, see Patent Document 1.)

Patent Document 1: Japanese Patent Application Laid-Open No. 2003-315070

DISCLOSURE OF THE INVENTION

Problems to be Solved by the Invention

In the above described ITS, a user can use a wireless apparatus to transmit/receive information in the vehicle-mounted device. A radio wave from this wireless apparatus spreads to some range, which thus causes a problem in that information for a lane in another direction is acquired. In this current ITS, it is difficult to sense a traveling direction of a vehicle, and there is no mechanism in which a large amount of provided information can be individually discriminated. Therefore, there is a problem in that optimal information cannot be easily selected from many information groups. As a result, there is a problem in that unnecessary information is provided to the user.

Consequently, an object of the present invention is to solve the above described problems, that is, to provide a vehicle-mounted device which can provide only necessary information to the user even in a system using wireless, as well as an information output method and an information providing system therefor.

Means for Solving the Problems

A vehicle-mounted device according to the present invention receives and outputs a radio wave including at least direction information as information, and includes detection means for detecting the radio wave; and control means for deciding whether the information can be outputted, by comparing a detection direction received from direction detection means for detecting a direction in which a vehicle head of a vehicle is oriented, with the direction information.

The vehicle-mounted device in an embodiment includes the direction detection means.

The direction detection means of an embodiment includes terrestrial magnetism detection means for detecting terrestrial magnetism.

The information according to the present invention includes at least one of emergency disaster information, safe driving support information, long sentence reading out information, and local information.

If the information is the emergency disaster information, the control means of an embodiment of the present invention necessarily decides to output the information.

A method according to the present invention includes a detection step of detecting a radio wave including at least direction information as information; and a control step of deciding whether the information can be outputted, by comparing a detection direction detected in direction detection means for detecting a direction in which a vehicle head of a vehicle is oriented, with the direction information detected in the detection step.

An information providing system according to the present invention includes direction detection means for detecting a direction in which a vehicle head of a vehicle is oriented, and outputting the direction as a detection direction; a roadside wireless apparatus for transmitting a radio wave including at least direction information related to a traveling direction of a road, as information; a vehicle-mounted device which includes detection means for detecting the radio wave, and control means for deciding whether the information can be outputted, by comparing the detection direction with the direction information; and a server apparatus for transmitting the information via the roadside wireless apparatus.

Effect of the Invention

According to the present invention, consequently, the present invention can solve the above described problems, that is, can provide the vehicle-mounted device which can provide only the necessary information to the user even in the system using wireless, as well as the information output method and the information providing system therefore.

DESCRIPTION OF REFERENCES

1 . . . Information providing system,
3 . . . Wireless communication unit (detection means),
6 . . . Control unit (control means, direction detection means),
7 . . . Direction detection unit (direction detection means),
10 . . . Vehicle-mounted device (vehicle-mounted device),
20 . . . Roadside apparatus,
30 . . . Server apparatus

BEST MODES FOR CARRYING OUT THE INVENTION

First Embodiment

Figure 1:
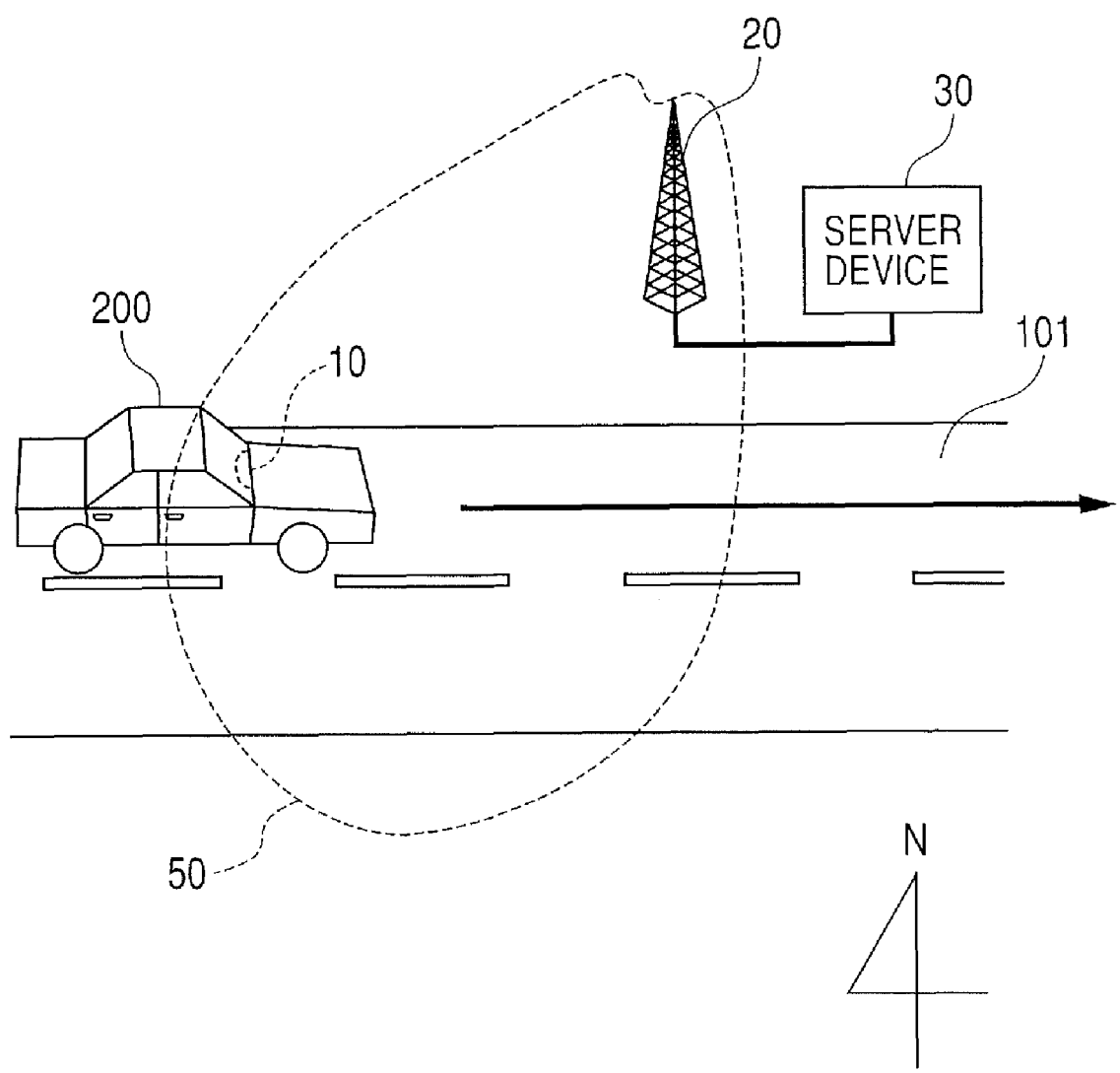
FIG. 1 is a schematic diagram showing an information providing system according to a first embodiment of the present invention.
Figure 2:
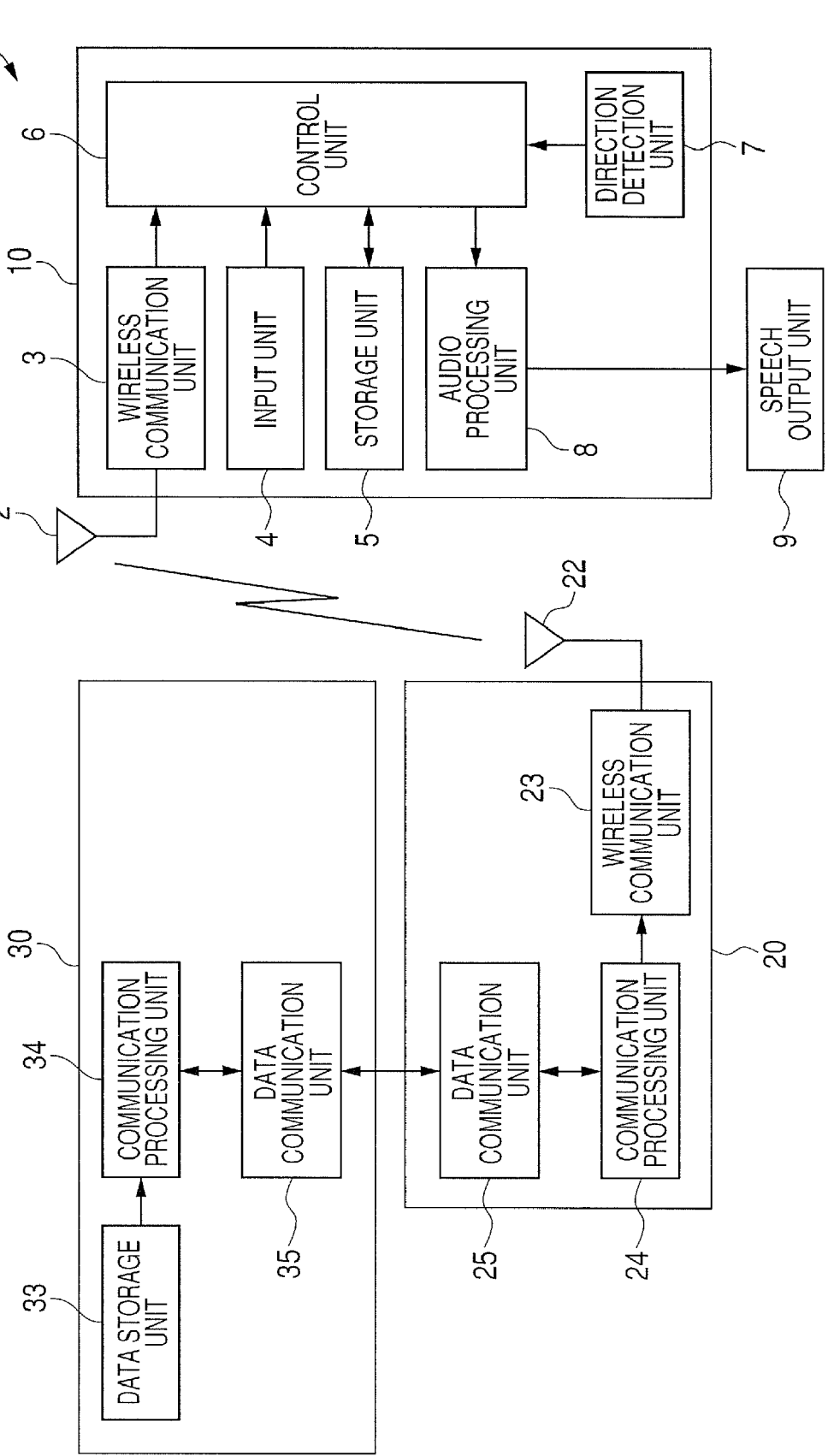
FIG. 2 is a block diagram showing a configuration of the information providing system of FIG. 1.

Hereinafter, an embodiment of the present invention will be described based on FIG. 1. FIG. 1 is a schematic diagram showing an outline of an information providing system 1 according to an embodiment of the present invention. Moreover, FIG. 2 is a block diagram showing an example of a configuration of the information providing system 1 of FIG. 1.

In FIG. 1, the information providing system 1 is configured to have a vehicle-mounted device 10, a roadside apparatus 20 and a server apparatus 30. The vehicle-mounted device 10 is an embodiment of a vehicle-mounted device according to the present invention, and is a device mounted on a vehicle 200. The vehicle-mounted device 10 is typically installed near a driving seat of the vehicle 200, which is a position at which a driver can operate the vehicle-mounted device. The vehicle-mounted device 10 is connected to a navigation apparatus and transmits speech or image data to be described later, to the navigation apparatus, and also, there is the vehicle-mounted device 10 which obtains position information, vehicle speed information, direction information and the like from the navigation apparatus, the vehicle-mounted device 10 which is connected to an audio apparatus and transmits audio information to the audio apparatus, or the vehicle-mounted device 10 which performs an utterance process for received audio information by the vehicle-mounted device 10 itself (which, hereinafter, may also be referred to as "utterance type vehicle-mounted device"). The present embodiment will be described using the utterance type vehicle-mounted device as a form of the vehicle-mounted device 10, while the present embodiment is also naturally applicable to the vehicle-mounted device connected to the above described other apparatuses. On the other hand, in the utterance type vehicle-mounted device which does not connect to other external apparatuses, even if various information related to the vehicle, such as the position information on the vehicle itself, cannot be acquired since the utterance type vehicle-mounted device does not connect to the other external apparatuses, discrimination of an inbound/outbound lane can be easily realized at low cost.

In a space of FIG. 1, the vehicle 200 (Hereinafter referred to as "the vehicle in the east direction") is traveling in the east direction on a lane 101 for traveling in the east direction. In the first embodiment, a radio wave from the roadside apparatus 20 is emitted toward the lane 101.

The roadside apparatus 20 is an apparatus which is installed at the side of or above a road on which the vehicle travels, or in the ground or the like, and provides various information to the vehicle traveling on the road, through a short distance communication system or the like. A plurality of the roadside apparatuses 20 are installed at intervals along the road. Moreover, the roadside apparatuses 20 are arranged corresponding to each inbound/outbound lane.

The server apparatus 30 is connected to the roadside apparatus 20 via a wired or wireless communication channel. Moreover, the server apparatus 30 is a device which acquires various information to be transmitted to the roadside apparatus 20, and transmits predetermined information to an arbitrary roadside apparatus 20. Moreover, in the present embodiment, the plurality of the roadside apparatuses 20 are assumed to be connected to one server apparatus 30, while a configuration may be employed in which one roadside apparatus 20 is connected to one server apparatus 30.

In the first embodiment, as shown in the figure, the vehicle-mounted device 10 is configured to have an antenna 2, a wireless communication unit 3, an input unit 4, a storage unit 5, a control unit 6, a direction detection unit 7, an audio processing unit 8, a speech output unit 9 and the like. The antenna 2 is connected to the wireless communication unit 3, and the speech output unit 9 is connected to the audio processing unit 8. The wireless communication unit 3, the input unit 4, the storage unit 5 and the audio processing unit 8 are connected to the control unit 6.

The antenna 2 included in the vehicle-mounted device 10 is an antenna for receiving a radio wave which has been wirelessly transmitted from the roadside apparatus 20. The antenna 2 is used along with a booster (not shown) for amplifying the radio wave, or the like.

In the vehicle-mounted device 10, the wireless communication unit 3 as detection means has a wireless communication circuit for executing communication with a wireless communication unit 23 (to be described later in detail) of the roadside apparatus 20 by a predetermined wireless communication system. As the wireless communication system between the wireless communication unit 3 included in the vehicle-mounted device 10 and the wireless communication unit 23 to be described later included in the roadside apparatus 20, a Dedicated Short Range Communication (DSRC) system is employed. However, another system may be employed. Moreover, the wireless communication unit 3 includes a demodulation unit (not shown) for demodulating a signal which is carried on the received radio wave and is a modulated signal. Moreover, the demodulation unit demodulates each signal carried on the radio wave, separates and filters each signal into each signal for each object, and distributes each signal into each device in order to achieve each object. For example, if the audio information to be described later and the direction information have been extracted from information superimposed on the received radio wave, the demodulation unit outputs the audio information to the storage unit 5, and outputs the direction information to the control unit 6.

The input unit 4 is a part of a user interface, and is a portion including one or more of a push button, a touch panel, a speech input system, a remote controller and the like. The input unit 4 is a portion which serves a function as input means for giving an instruction for volume adjustment or the like to the vehicle-mounted device 10 by a user.

The storage unit 5 is a portion in which any one or more of the various information, data, programs and the like are stored. For example, one or more of the audio information, the direction information and the like which have been wirelessly received can be stored.

The control unit 6 functions as control means and direction detection means. For example, the control unit 6 includes a signal processing unit such as a CPU. Specifically, instructions, information, data and the like from the wireless communication unit 3, the input unit 4, the storage unit 5 and the direction detection unit 7 are inputted to the control unit 6. Then, the control unit 6 reads out a predetermined control program and data which are stored, from a ROM (Read Only Memory) (not shown) or a RAM (Random Access Memory) (not shown) included in the control unit 6, respectively, and executes various calculations and processes. Furthermore, the control unit 6 outputs the processed data to each unit, and thereby performs control of each device. It should be noted that the ROM is a read only memory for storing a control program and each constant for controlling each unit by the control unit 6. The RAM is a volatile storage area for temporarily storing information communicated with various devices or information included in an acquired signal, based on a control command from the control unit 6. Moreover, the RAM is used as a work memory of the control unit 6.

The direction detection unit 7 functions as the direction detection means, and may be provided separately from the vehicle-mounted device 10, or may be provided in the vehicle-mounted device 10. The direction detection unit 7 is configured with, for example, an electronic compass having a magnetic sensor capable of detecting terrestrial magnetism, or the like. Specifically, as the direction detection unit 7, an electronic compass having a triaxial sensor in which three magnetic sensors capable of sensing weak terrestrial magnetism are used can be employed. In the triaxial sensor, the three magnetic sensors are orthogonally combined so that the terrestrial magnetism in a back-and-forth direction, a left-and-right direction and an up-and-down direction can be detected. In addition, the north direction can be calculated from strength of the terrestrial magnetism in each direction, and a direction in which a vehicle head is oriented can be detected as a detection direction, based on the calculated north direction. Moreover, a biaxial sensor in which two magnetic sensors are used and which detects the terrestrial magnetism in the back-and-forth direction and the left-and-right direction may be employed. However, when the electronic compass having the triaxial sensor is used, the direction can be more easily calculated on a hill or the like. Moreover, near a magnetic substance or high-voltage electrical power lines, so-called magnetization may occur in which a magnetic field distribution around the magnetic sensors is disturbed. Therefore, as the direction detection unit 7, such an electronic compass which can mitigate an effect of the disturbed magnetic field distribution if the magnetization occurs is preferably used.

The audio processing unit 8 converts audio data into a reproducible speech signal. The converted speech signal is transmitted to the speech output unit 9, and the speech output unit 9 outputs the speech signal as speech.

The roadside apparatus 20 includes an antenna 22, the wireless communication unit 23, a communication processing unit 24 and a data communication unit 25. The wireless communication unit 23 is connected to the communication processing unit 24, and the communication processing unit 24 is connected to the data communication unit 25.

The wireless communication unit 23 in the roadside apparatus 20 has a wireless communication circuit for performing the communication with the wireless communication unit 3 of the vehicle-mounted device 10 by the wireless communication system of the DSRC system, or the like. Various data modulated in the wireless communication unit 23 is transmitted via the antenna 22 to the vehicle-mounted device 10. The data communication unit 25 is a communication apparatus for communicating with the server apparatus 30 wirelessly or via wires. Moreover, the communication processing unit 24 is a processing unit for supplying various information received by the data communication unit 25, to the wireless communication unit 23.

In the present embodiment, the roadside apparatus 20 shown in FIG. 1 transmits the information to the lane 101 for traveling in the east direction with respect to the space. Moreover, the radio wave emitted from such an antenna 22 can be received by the utterance type vehicle-mounted device 10 in an area surrounded by a receivable area 50 shown by a dashed line in FIG. 1. As shown in FIG. 1, the vehicle 200 is a vehicle which includes the vehicle-mounted device 10 and travels on the lane 101 drawn in FIG. 1, in the east direction.

As shown in FIG. 2, the server apparatus 30 has a data storage unit 33, a communication processing unit 34 connected to the data storage unit 33, and a data communication unit 35. Moreover, the communication processing unit 34 is connected to the data storage unit 33. It should be noted that a configuration may be employed in which the server apparatus 30 is connected to another large server apparatus via a communication network such as the Internet.

In the server apparatus 30, the data communication unit 35 is a communication apparatus for communicating with the data communication unit 25 of the roadside apparatus 20. The data storage unit 33 includes a storage medium for storing each information, such as regional information including regional information, and road information including a neighboring road situation, as digital information data. The storage medium included in the data storage unit 33 includes a hard disk drive or the like. The communication processing unit 34 first reads out the various information such as the road information, from the data storage unit 33. In addition, the communication processing unit 34 is a processing unit for transmitting the various information data read out from the data storage unit 33, via the data communication unit 35 to a desired roadside apparatus 20, and causing the various information data to be transmitted from the desired roadside apparatus 20 to the vehicle-mounted device 10. It should be noted that the communication processing unit 34 may be configured with a dedicated integrated circuit, or may be realized by executing a program by a processor.

The information data stored in the data storage unit 33 is information which can be added or deleted depending on an occurrence of a disaster, an occurrence of a jam, a change in weather conditions and the like. Moreover, it is not necessary to transmit all the information data stored in the data storage unit 33 to the roadside apparatus 20, and the communication processing unit 34 reads out only the information data deemed to be necessary, from the data storage unit 33, and transmits the information data as the various information to the desired roadside apparatus 20.

The information to be provided to the utterance type vehicle-mounted device 10 includes the audio information, an information distinction, a road distinction, the direction information, a lane distinction, a route number and the like. The audio information is information for performing speech output. As the information for performing the speech output, for example, the speech may be modulated and superimposed on the radio wave, or may be coded and superimposed as digital audio data on a carrier wave. The information distinction indicates an utterance information distinction, for example, which is classified into emergency disaster information, safe driving support information, an electronic sign, long sentence reading out information, or local information, which will be described below, or the like. The road distinction represents a distinction of a road, for example, such as an expressway, a toll road or a general national highway. The direction information includes direction data indicating a traveling direction of a lane to which the information is transmitted by the roadside apparatus 20, or the like. The direction data is indicated by four directions or 16 directions of north, south, east and west, or an azimuth angle or the like. The lane distinction is configured to have inbound/outbound lane data for distinguishing an inbound/outbound lane on a major arterial road or the like, go-around direction data indicating an inner lane or an outer lane on a ring road, and the like. Moreover, the route number indicates the route number of the road.

The emergency disaster information as the audio information is, for example, information for giving the user an instruction for an action such as stop of the vehicle or evacuation, when a natural disaster such as an earthquake or a tsunami occurs, or the like. The safe driving support information is information on a sharp curve, a fallen object, a stopped vehicle, a junction or the like which exists ahead, and is information for supporting the driver's safe driving. For example, audio information such as "A broken-down vehicle exists ahead" is the safe driving support information. The electronic sign is information for giving an alarm for a point described on a sign, for example, such as a speed limit, a position of a sidewalk, or a no-parking zone. The long sentence reading out information is information for traffic situations, weather conditions or a safety policy appeal to the driver. The local information is information for giving an alarm for a road surface condition, a point where there is a sudden change in the weather, or the like. For example, audio information such as "The road surface at the exit of this tunnel is currently frozen." is the local information.

Figure 3:
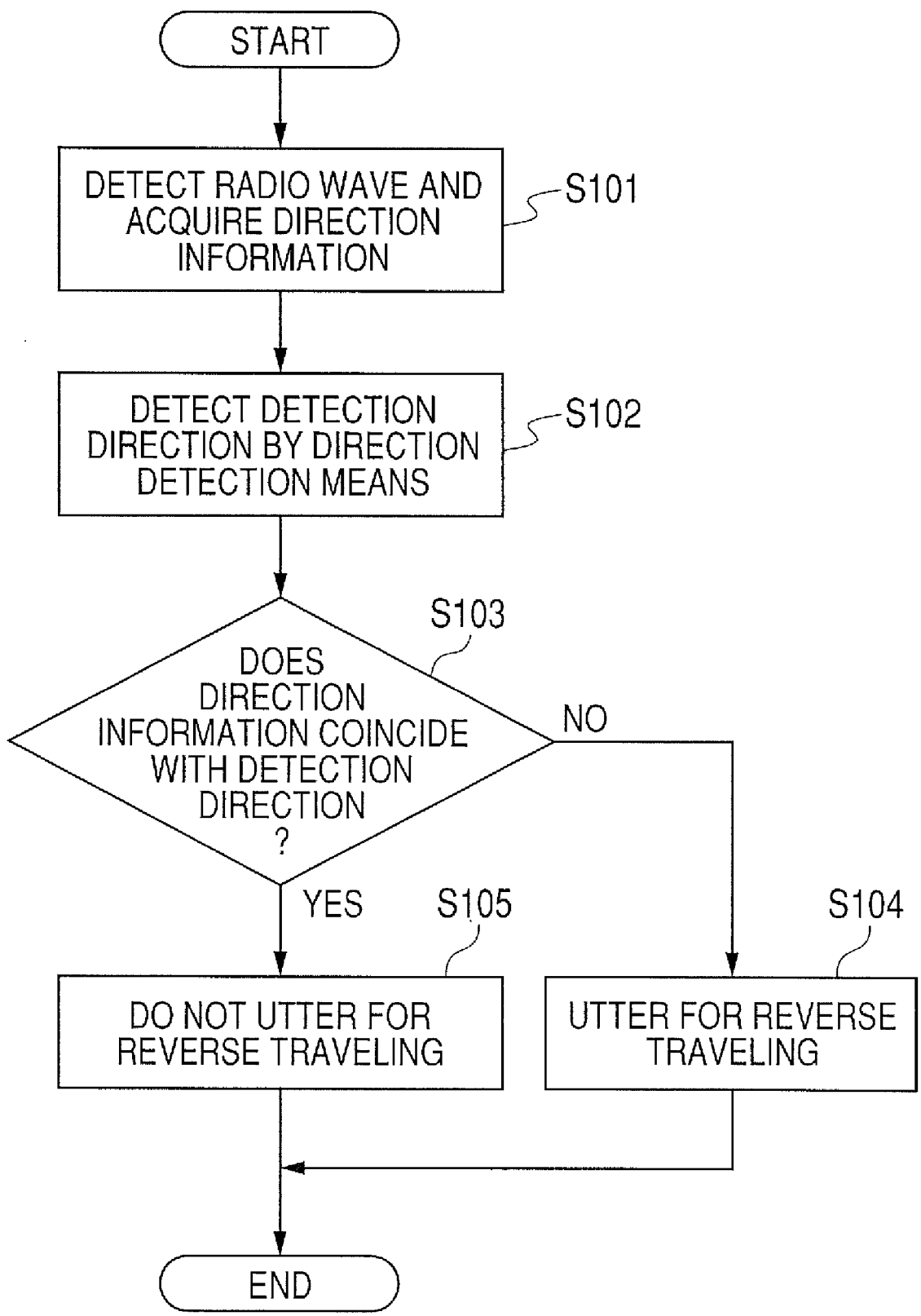
FIG. 3 is a flowchart showing operations of a vehicle-mounted device according to the first embodiment.

Next, operations of each apparatus in the above described information providing system 1 will be described. FIG. 3 is a flowchart showing processing operations of the utterance type vehicle-mounted device 10 in the first embodiment when the radio wave is received.

First, the wireless communication unit 23 of the roadside apparatus 20 transmits the radio wave carrying the direction information, the audio information or the like, via the antenna 22 to a desired road.

The wireless communication unit 3 of the vehicle-mounted device 10 is monitoring a reception status of the radio wave transmitted from the roadside apparatus 20. When the vehicle 200 including the vehicle-mounted device 10 enters the receivable area of the radio wave transmitted from the roadside apparatus 20, the wireless communication unit 3 detects the radio wave transmitted from the roadside apparatus 20, via the antenna 2, and acquires the direction information (step S101: detection step).

Next, the direction detection unit 7 of the vehicle-mounted device 10 detects the direction in which a type of the vehicle head is oriented, as the detection direction (step S102). The direction detection unit 7 obtains the detection direction by subtracting an offset amount which is a signal output caused by an environmental magnetic field other than the terrestrial magnetism sensed by the magnetic sensor, and an output of a signal processing circuit when no signal is inputted, by a publicly known method. The information on the detected detection direction is transmitted to the control unit 6.

Next, the control unit 6 compares the direction information received from the radio wave, with the detection direction detected by the direction detection unit 7 of the vehicle-mounted device 10 (step S103: control step). It should be noted that a process in step S102 may be constantly performed at specific time intervals, instead of being performed subsequent to a process in step S101, and the detected detection direction which is the latest may be stored in the storage unit 5, and the determination in step S103 may be performed based on the direction information detected in step S101. If the wirelessly received direction information and the detection direction detected by the direction detection unit 7 coincide with each other, the control unit 6 makes an affirmative (YES) decision in step S103. Then, the control unit 6 does not utter the audio information for giving an alarm for reverse traveling (step S105). In other words, the control unit 6 does not transmit the audio information to the audio processing unit 8.

On the other hand, if the wirelessly received direction information and the detection direction detected by the direction detection unit 7 do not coincide with each other, the control unit 6 makes a negative (NO) decision in step S103. Then, the control unit 6 utters the audio information for giving the alarm for the reverse traveling (step S104). When the control unit 6 decides to utter the audio information for giving the alarm for the reverse traveling, the control unit 6 acquires the audio information for giving the alarm for the reverse traveling, which is stored in the storage unit 5, from the storage unit 5, and transmits the audio information to the audio processing unit 8. The audio processing unit 8 converts the audio information into the speech signal, and transmits the converted speech signal to the speech output unit 9. The speech output unit 9 outputs the speech signal as the speech.

In the present embodiment, direction information indicating the east is carried on the radio wave. Therefore, the vehicle-mounted device 10 included in the vehicle 200 going in the east direction makes the affirmative decision in step S103, and thus, the audio information for the reverse traveling is not uttered. On the other hand, if there is a vehicle traveling on the lane 101 in the west direction, the vehicle-mounted device 10 included in the vehicle transmits information indicating that the detection direction detected by the direction detection unit 7 is west, to the control unit 6, whereas the direction information carried on the radio wave provided to the lane 101 in the east direction is the information indicating the east. Thus, in step S103, the wirelessly received direction information and the detection direction detected by the direction detection unit 7 do not coincide with each other, and therefore, the control unit 6 makes the negative (NO) decision in step S103. Then, the audio information for the reverse traveling, which is stored in the storage unit 5, is uttered.

As described above, the information providing system 1 according to the first embodiment of the present invention can give the alarm for the reverse traveling, to the vehicle which performs the reverse traveling, by comparing the direction information included in the transmitted radio wave, with the detection direction acquired from the direction detection unit 7 included in the vehicle-mounted device 10, even in the vehicle not including a GPS sensor, a gyroscope or the like.

Next, operations of an information providing system 1A according to a second embodiment will be described. FIG. 2 is also applied to the second embodiment. Thus, overlapping descriptions are omitted, and also, the same element as the first embodiment is assigned the same reference and will be described.

Figure 4:
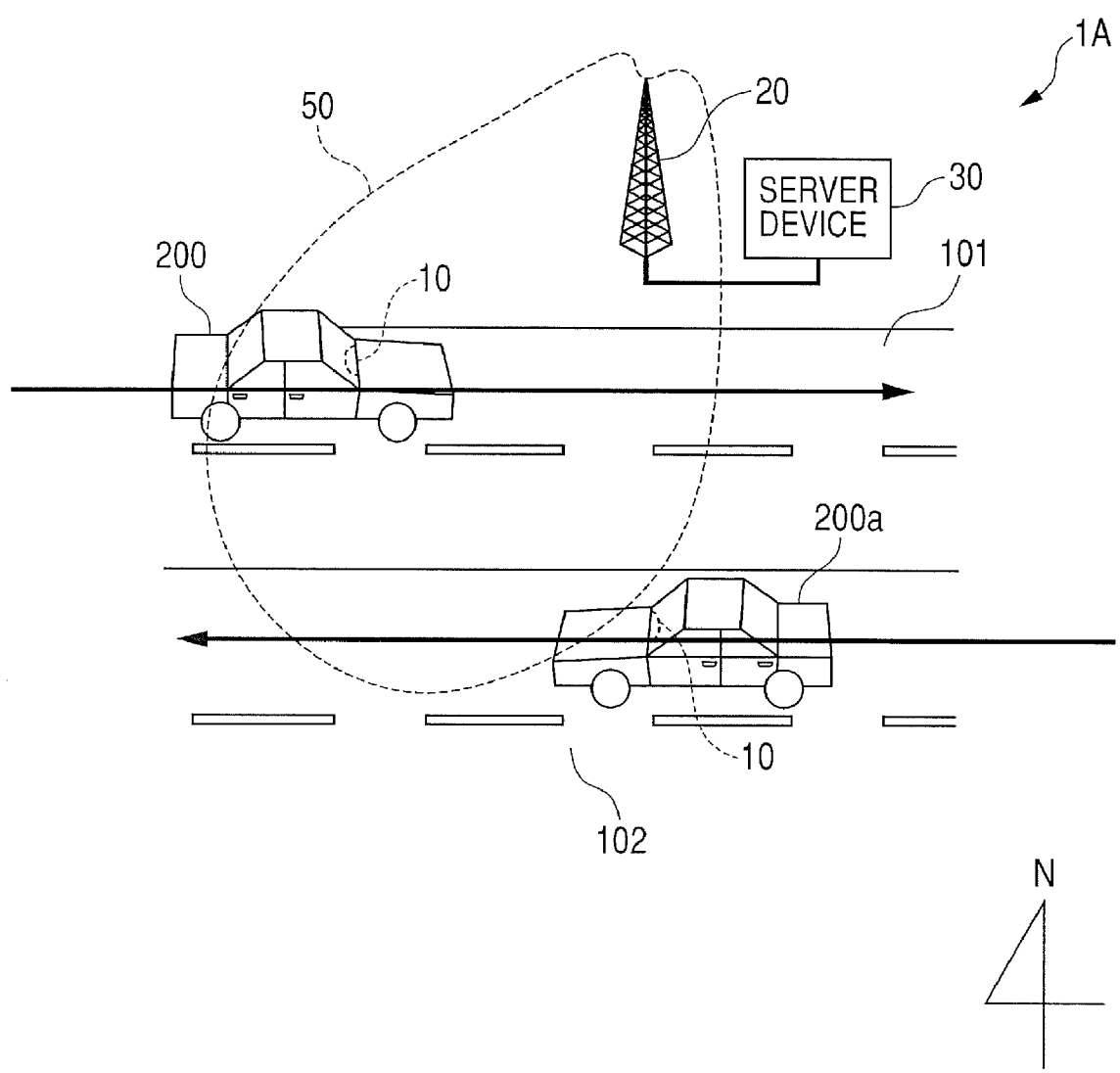
FIG. 4 is a schematic diagram showing the information providing system according to a second embodiment of the present invention.

FIG. 4 is an explanatory diagram of the information providing system 1A according to the second embodiment. In the second embodiment, the lane 101 for traveling in the east direction in the space (Hereinafter referred to as "the lane in the east direction".), and a lane 102 for traveling in the west direction in the space (Hereinafter referred to as "the lane in the west direction".) are adjacently extended.

In the second embodiment, similarly to the first embodiment, the radio wave from the roadside apparatus 20 is emitted toward the vehicle 200 traveling on the lane 101 in the east direction. However, the receivable area 50 of the radio wave intrudes in a part of the lane 102 in the west direction. Since the wirelessly transmitted radio wave has a different arrival distance depending on the weather or the like, a radio wave transmitted toward only a certain lane (in this example, the lane 101 in the east direction) may also be able to be received in the lane in the west direction (in this example, the lane 102 in the west direction) as shown in FIG. 4.

Figure 5:
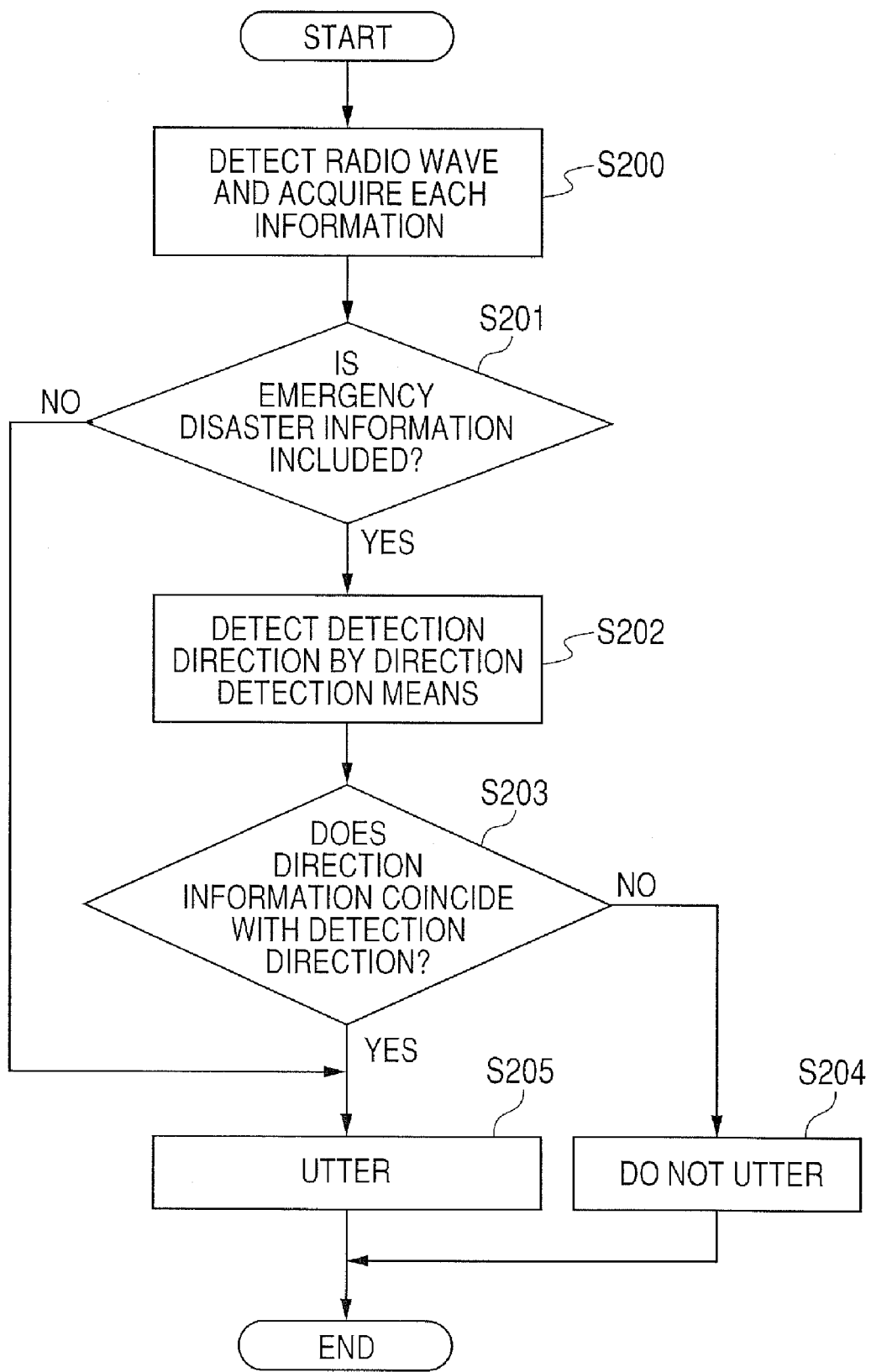
FIG. 5 is a flowchart showing the operations of the vehicle-mounted device according to the second embodiment.

Hereinafter, the operations of the information providing system 1A according to the second embodiment will be described. FIG. 5 is a flowchart describing the operations of the utterance type vehicle-mounted device 10 according to the second embodiment.

First, the communication processing unit 34 of the server apparatus 30 periodically reads out the various information data stored in the data storage unit 33, and transmits the various information data via the data communication unit 35 to a communication region in which the desired roadside apparatus 20 exists.

The roadside apparatus 20, which has received the various information by the data communication unit 25, transmits the information via the communication processing unit 24 to the wireless communication unit 23. The wireless communication unit 23, which has received the various information, modulates the various information, and subsequently causes the various information to be carried on the radio wave, and transmits the radio wave from the antenna 22 to the road.

The wireless communication unit 3 of the vehicle-mounted device 10 is monitoring the reception status of the radio wave transmitted from the roadside apparatus 20. When the vehicle-mounted device 10 enters a communication area of the roadside apparatus 20, the wireless communication unit 3 detects the radio wave transmitted from the roadside apparatus 20, via the antenna 2. Specifically, the various information carried on the detected radio wave is acquired (step S200: detection step).

Next, the control unit 6 decides whether or not the emergency disaster information is included in the audio information detected in step S200 (step S201).

In step S201, if the control unit 6 decides that the emergency disaster information is not included in the audio information (YES in step S201), next, the direction detection unit 7 detects the direction as the detection direction (step S202).

Next, the control unit 6 compares the detection direction detected by the direction detection unit 7 with the direction information included in the radio wave (step S203: control step). If the detection direction detected by the direction detection unit 7 and the direction information included in the radio wave coincide with each other, an affirmative (YES) decision is made.

If the detection direction detected by the direction detection unit 7 and the direction information included in the radio wave do not coincide with each other, that is, if a negative decision (NO) is made in step S203, the control unit 6 does not utter the various information (step S204).

If a negative (NO) decision is made in step S201, and if the affirmative (YES) decision is made in step S203, the control unit 6 utters the audio information (step S205). Specifically, the control unit 6 outputs the audio information to the audio processing unit 8. The audio processing unit 8 converts the audio information into the speech signal, and the speech output unit 9 outputs the speech signal as the speech.

As described above, the information providing system 1A according to the second embodiment of the present invention can decide whether or not to utter the received information, based on criteria, such as whether or not the emergency disaster information is included, and whether or not the traveling direction is correct. Therefore, like the safe driving support information or the like, information related to only one certain direction is not uttered by the vehicle-mounted device 10 included in a vehicle heading in another direction. Thus, confusion caused by utterance of unrelated information and the like can be prevented.

Furthermore, if the audio information includes the emergency disaster information, the vehicle-mounted device 10 can output the emergency disaster information as the speech, without performing a process for deciding a traveling direction. Thus, the driver can acquire the emergency disaster information sooner, regardless of the inbound/outbound lane.

While the first embodiment and the second embodiment of the present invention have been described above, the present invention is not limited to the first embodiment and the second embodiment, and various variations and combinations are possible.

For example, in the first embodiment and the second embodiment, the various information is included in the radio wave transmitted from the roadside apparatus 20, which, however, is not limited to such a form. The roadside apparatus 20 may transmit a radio wave including only the direction information. Moreover, the roadside apparatus 20 which transmits the direction information and the roadside apparatus which emits a radio wave including the various information other than the direction information may be separately installed.

Moreover, in the first embodiment and the second embodiment, if the direction information included in the radio wave and the detection direction detected by the direction detection unit 7 of the vehicle-mounted device 10 coincide with each other, the audio information is outputted, or is not outputted, which, however, is not limited to such a form. For example, at the exit and the entrance of the expressway or the exit and the entrance of a service area, the roadside apparatus 20 for giving the alarm for the reverse traveling may be provided, and the roadside apparatus 20 for giving the alarm for the reverse traveling may have the audio information which is uttered only in the case of the reverse traveling. Moreover, the direction information included in the radio wave may not exactly coincide with the detection direction detected by the direction detection unit 7 of the vehicle-mounted device 10, and an error or the like may be considered. For example, in the case where the 16 directions are used, if the direction information includes information indicating "north", and the detection direction information is "northwest" and "northeast", it may be recognized that the direction information and the detection direction coincide with each other, also in consideration of the error or the like.

Moreover, in the first embodiment, the order of step S101 of detecting the direction information and step S102 of detecting the detection direction may be reversed. Alternatively, step S101 of detecting the direction information may be operated simultaneously with step S102 in which the direction detection unit 7 detects the detection direction.

Moreover, if the received information includes the emergency disaster information, the vehicle-mounted device 10 according to the second embodiment utters the information, while such a decision is not essential. Moreover, in the radio wave including the emergency disaster information, if other audio information is received along with the emergency disaster information, only the emergency disaster information may be uttered. Moreover, it may be decided in step S202 to step S205 whether the audio information other than the emergency disaster information, which has been received along with the emergency disaster information, can be uttered, and only the emergency disaster information may be uttered first.

Moreover, in each embodiment, the electronic compass is employed as the direction detection unit 7, which, however, is not limited to such a form. Something like a compass may be used. However, the electronic compass is more preferably used because the magnetization can be corrected or the like, and in addition, the detection direction can be acquired as an electrical signal.

Furthermore, the vehicle-mounted device 10 in each embodiment may be configured to be connected to the navigation apparatus, or may be configured to be embedded in the navigation apparatus.

Moreover, the whole or a part of a function of each constituent block included in the information providing system 1 and the information providing system 1A of the above described embodiments may be realized by software, or at least a part thereof may be realized by hardware. For example, the whole or a part of the process in the control unit 6 may be realized by one or more programs on a computer, or at least a part thereof may be realized by hardware.

Moreover, the above described embodiments are absolutely for explanatory purposes, and are not for limiting the scope of the present invention. For example, a computer program for causing the vehicle-mounted device 10 to operate as the whole or a part of the device may be stored and distributed in a computer-readable recording medium such as a memory card, a CD (compact disc), a DVD (digital versatile disk) or an MO (magneto-optical), and installed in another computer, for example, a cellular phone, an audio apparatus, an electronic watch or the like, and caused to operate as the vehicle-mounted device 10, or caused to execute the steps performed by the vehicle-mounted device 10. Furthermore, the program may be stored in a disk device included in a server apparatus on the Internet, or the like, and for example, superimposed on a carrier wave, and downloaded to a computer which becomes the vehicle-mounted device 10, or the like.

It should be noted that the utterance type vehicle-mounted device 10 which outputs only the speech is employed in each embodiment, while the vehicle-mounted device 10 is not limited to that which outputs only the speech, and the output may be performed by such means in which the user can recognize visually, acoustically, by the sense of smell, tactually or the like. Specifically, for example, the vehicle-mounted device 10 which outputs the information by means of vibration, a video, an image, light or the like may be employed. Moreover, the vehicle-mounted device which outputs the information by two or more methods may be employed. Moreover, if the information is outputted by means of the video or the like, text information, stationary image information, video information, information including a combination thereof, or the like may be added to the information transmitted from the roadside apparatus 20.

The invention claimed is:

1. An information providing system, comprising:
   a direction detection unit configured to detect a direction in which a vehicle head of a vehicle is oriented, and outputting the direction as a detected direction;
   a roadside apparatus for transmitting a radio wave including information, the information including at least direction information related to a traveling direction of a road;
   a vehicle-mounted device which includes a detection unit configured to detect the radio wave, and a control unit configured to decide whether or not the information is to be outputted, by comparing the detected direction with the direction information; and
   a server apparatus for transmitting the information via the roadside apparatus,
   wherein the control unit outputs emergency disaster information regardless of the direction detected by the direction detection unit when the information includes the emergency disaster information.

2. The information providing system according to claim 1, wherein the vehicle-mounted device comprises the direction detection unit.

3. The information providing system according to claim 1, wherein the direction detection unit comprises a terrestrial magnetism detection unit configured to detect terrestrial magnetism.

4. The information providing system according to claim 1, wherein the information includes at least one of emergency disaster information, safe driving support information, long sentence reading out information, and local information.

* * * * *